Feb. 7, 1961  C. E. ARMSTRONG  2,971,075
SAFETY DEVICE FOR ELECTRICAL HEATERS
Filed May 25, 1959
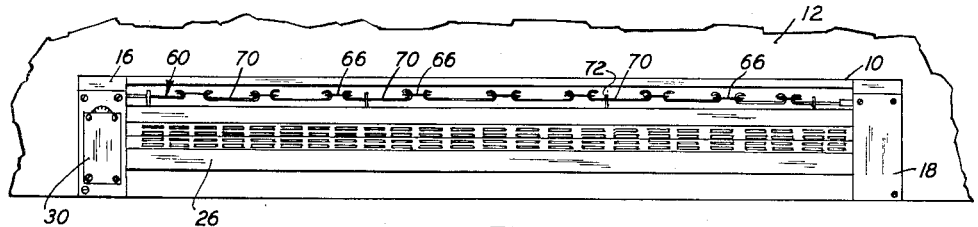
FIG.1
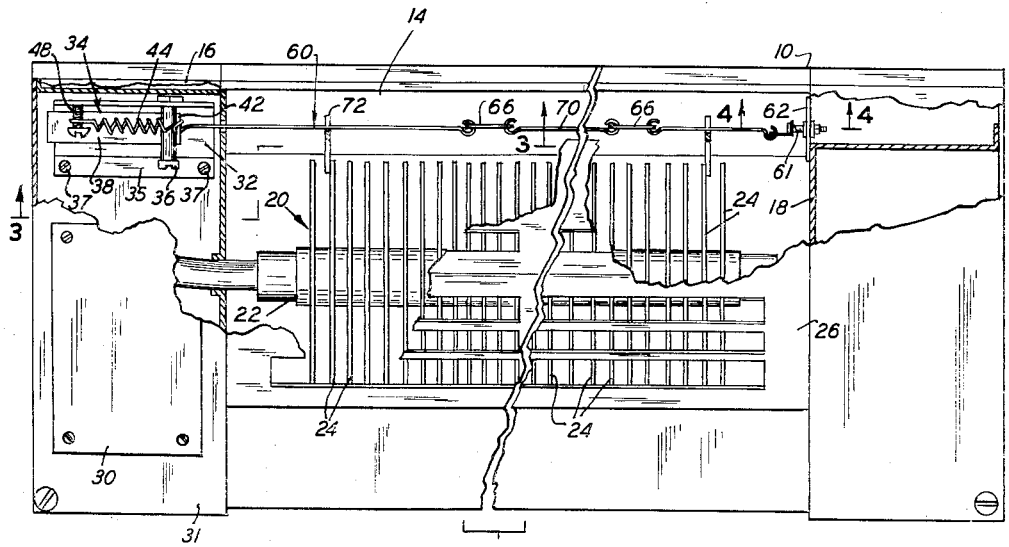
FIG.2
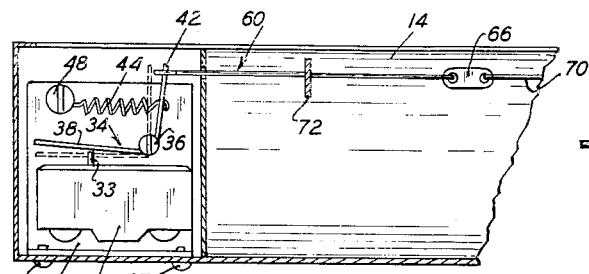
FIG.3
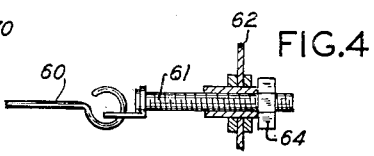
FIG.4
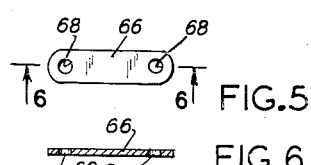
FIG.5
FIG.6
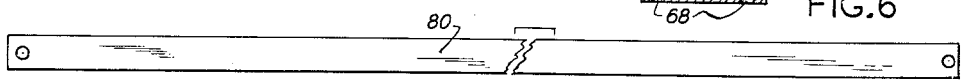
FIG.7
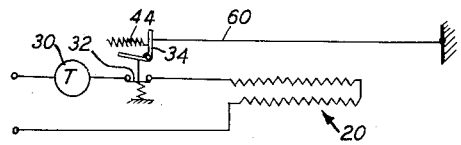
FIG.8
*INVENTOR.*
CHARLES E. ARMSTRONG
BY
BUCKHORN, CHEATHAM & BLORE
ATTORNEYS

United States Patent Office 2,971,075
Patented Feb. 7, 1961

2,971,075

SAFETY DEVICE FOR ELECTRICAL HEATERS

Charles E. Armstrong, Portland, Oreg., assignor to C. E. Armstrong Company, Portland, Oreg., a corporation of Oregon Filed May 25, 1959, Ser. No. 815,468

2 Claims. (Cl. 219—34)

The present invention relates to a safety device for electrical heaters and more particularly to a safety device for use with baseboard heaters and the like.

The conventional electrical baseboard heating unit comprises an elongate housing in which is supported a longitudinally extending electrical resistance type heating element. The housing is provided with openings on the side facing the room so that air can traverse the housing to conduct heat from the heating element and convey it to the room. A hazard heretofore existent with such heaters is that an object might be positioned in front of the heater and block the access of air so that the heat cannot be conducted away with the consequence that the temperature in the housing might rise to an unsafe level.

It is an object of the present invention to provide means for preventing the rise of temperature within the baseboard heating housing to an unsafe level.

More particularly, it is an object of the present invention to provide means for cutting off the supply of electrical power to the heating unit of a baseboard heater if the temperature within the heater housing exceeds a predetermined level at any point along its length.

Other objects and advantages of the invention will become more apparent hereinafter.

In accordance with the illustrated embodiment, in the present invention the circuit to the heating element of a baseboard heater is provided with a normally closed switch adjacent which is arranged a switch operating member which is movable between a switch opening and a switch closing position. The switch and operating member are mounted adjacent one end of the heater housing and a tension member is connected at one end to the operating member and extends longitudinally of the housing above the heating element, the tension member being anchored at its opposite end so that the operating member is held in its switch closing position. The tension member is provided with heat fusible portions adapted to fuse when the temperature within the housing exceeds a predetermined temperature at any point along its length so as to release the operating member to effect opening of the switch in the circuit of the heating element, thus to prevent further temperature rise.

For a more detailed description of the invention, reference is made to the accompanying drawings wherein:

Fig. 1 is a plan view of a typical baseboard heater showing it mounted in the wall;

Fig. 2 is an enlarged view of the electrical heater of Fig. 1 partially broken away to show details thereof;

Fig. 3 is a sectional view taken substantially along line 3—3 of Fig. 2;

Fig. 4 is a sectional view taken substantially along line 4—4 of Fig. 2;

Fig. 5 is a plan view of the fusible link in the embodiment shown in Fig. 1;

Fig. 6 is a sectional view taken substantially along line 6—6 of Fig. 5;

Fig. 7 is a plan view of a modified type of fusible element usable in the invention; and Fig. 8 is a schematic circuit diagram of the invention.

Referring first to Figs. 1 to 6, inclusive, a typical baseboard heating unit is indicated generally at 10 and which is shown mounted along the bottom of a wall 12. The baseboard heating device 10 comprises a housing including a back wall 14 which includes a flat, vertically disposed lower portion extending along the back of the unit and which curves upwardly and forwardly adjacent the top of the unit to deflect the heated air outwardly from the heater. Provided at either end of the unit 10 are box-like structures 16, 18 in which are mounted the various electrical switching and control devices. Extending longitudinally of the unit between the boxes 16, 18 is a suitably mounted electrical resistance heating element 20 comprising a hollow core 22 in which are mounted the heating elements per se and to which core are secured fins 24 for dissipating heat from the core to the air passing thereover. A perforated shield 26 is mounted along the front of the unit 10 to prevent direct contact with the fins 24. As indicated, the lower edge of the guard 26 is spaced above the floor so that air may circulate into the unit beneath the guard and the upper edge is spaced below the top of the deflector portion of the back wall 14 so that air may circulate outwardly from the unit thereabove.

The baseboard unit may be provided with a thermostat 30 mounted in the front wall 31 of the box 16 though obviously the thermostat could be provided at some remote position.

As indicated in Fig. 8 circuit means are provided for connecting the heating elements to a power source and which circuit means may include the thermostat 30 and a switch means including a switch 32 which may be of the normally closed type having an operating plunger 33 which is depressed to open the switch. The switch 32 is secured to a mounting plate 35 mounted on the back wall 14 by suitable means, such as screws 37. Associated with the switch 32 is an operating member 34 pivoted about a pivot 36 secured to the mounting plate 35, the operating member having one arm 38 arranged to contact the operating plunger 33 of the switch 32 to depress the same and a second arm 42 to which is secured one end of a spring 44. The other end of the spring 44 is secured by suitable means, such as by a screw 48, to the switch mounting plate 35 so that the operating member 34 is urged to what may be termed its switch opening position. The operating member 34 is held in its switch closing position by a tension member 60 connected at one end to the arm 42 and extending longitudinally of the housing 10 above the heating element 20. As best shown in Fig. 4, the opposite end of the tension member 60 is connected to the end of a threaded element 61 extending through a bracket 62 suitably secured to the box structure 18, a nut 64 being provided so that the tension of the member 60 may be adjusted as desired. The tension member is preferably supported along its length by supports 72 extending upwardly from the fins 24.

In accordance with the invention, the tension member 60 comprises a portion which is fusible at a predetermined temperature so that when such temperature is exceeded within the housing 10, the fusible portion will fuse to disrupt the tension member permitting the spring 44 to move the operating member 34 to depress the plunger 33 and open the switch 32 breaking the circuit to the heating element 20. In the embodiment of the invention shown in Figs. 1 to 6, inclusive, the tension member 60 comprises a plurality of spaced links 66 formed of a material which will fuse at a desirably low temperature which is preferably at about 350° F. in accordance with the present underwriters' standards. The links 66 are provided with openings 68 at the opposite ends thereof in which may be hooked interconnecting links 70 which may be formed of a conventional wire material, such as iron. As will be apparent, if a unit should overheat causing a link 66 to fuse, such link can be easily replaced by adjusting the position of the nut 64 to provide slack in the tension member 60 so that a new link 66 can be inserted therein.

Instead of the link structure shown in Figs. 1 to 6, inclusive, the tension member may comprise a single link of fusible material as indicated at 80 in Fig. 7. Such a member would, of course, be responsive to the temperature within the housing 10 at any place along the length thereof.

Having illustrated and described the preferred embodiments of the invention, it should be apparent to those skilled in the art that the invention permits of modification in arrangement and detail. I claim as my invention all such modifications as come within the true spirit and scope of the appended claims.

I claim:

1. In an electric heating device comprising an elongate horizontally disposed housing having an opening along the upper edge of one longitudinal side thereof for the escape of heat, an electrical resistance heating element extending longitudinally of said housing, circuit means for connecting said element to a power source, said circuit means including a normally closed switch means mounted at one end of said housing and connected in series with said heating element, said switch means having an operating member movable between a switch opening and a switch closing position, means resiliently biasing said operating member to said switch opening position, and means for retaining said operating member in said switch closing position comprising a tension member extending longitudinally of said housing above said heating element and connected at one end to said operating member, means adjustably anchoring said tension member at its other end to the end of said housing opposite said one end so as to retain said operating member in switch closing position, said tension member including a plurality of portions along its length fusible at a predetermined low temperature whereby when said temperature is exceeded within said housing adjacent a said portion the same fuses to release said operating member and said switch means is caused to open.

2. In an electric heating device comprising an elongate horizontally disposed housing having an opening along the upper edge of one longitudinal side thereof for the escape of heat, an electrical resistance heating element extending longitudinally of said housing, circuit means for connecting said element to a power source, said circuit means including a normally closed switch means mounted at one end of said housing and connected in series with said heating element, said switch means having an operating member movable between a switch opening and a switch closing position, means resiliently biasing said operating member to said switch opening position, and means for retaining said operating member in said switch closing position comprising a tension member extending longitudinally of said housing above said heating element and connected at one end to said operating member, means adjustably anchoring said tension member at its other end to the end of said housing opposite said one end so as to retain said operating member in switch closing position, said tension member comprising a plurality of fusible links and alternate interconnecting links having a fusing point substantially higher than that of said fusible links, said fusible links having openings at the opposite ends of each, said interconnecting links having hooks at their opposite ends engaging in said openings so that a said fusible link may be easily and quickly removed or positioned between a pair of said interconnecting links.

References Cited in the file of this patent

UNITED STATES PATENTS

| 261,265 | Seymour | July 18, 1882 |
| 973,322 | Tucker et al. | Oct. 18, 1910 |
| 1,412,501 | Zinger | Apr. 11, 1922 |
| 2,151,319 | Finch | Mar. 21, 1939 |
| 2,626,340 | Huck | Jan. 20, 1953 |
| 2,724,044 | Campbell | Nov. 15, 1955 |

FOREIGN PATENTS

| 241,812 | Great Britain | Oct. 29, 1925 |